(12) United States Patent
Kreulen et al.

(10) Patent No.: US 7,503,000 B1
(45) Date of Patent: Mar. 10, 2009

(54) METHOD FOR GENERATION OF AN N-WORD PHRASE DICTIONARY FROM A TEXT CORPUS

(75) Inventors: Jeffrey Thomas Kreulen, San Jose, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 1799 days.

(21) Appl. No.: 09/629,831

(22) Filed: Jul. 31, 2000

(51) Int. Cl.
*G06F 17/00* (2006.01)

(52) U.S. Cl. .................. 715/259; 715/201; 715/245; 715/257; 707/7

(58) Field of Classification Search ............... 715/532, 715/245–277
See application file for complete search history.

(56) References Cited

U.S. PATENT DOCUMENTS

| | | | | |
|---|---|---|---|---|
| 5,440,481 A | * | 8/1995 | Kostoff et al. ............. | 707/5 |
| 5,742,834 A | * | 4/1998 | Kobayashi ................ | 704/10 |
| 5,745,602 A | * | 4/1998 | Chen et al. ................ | 382/229 |
| 5,857,179 A | * | 1/1999 | Vaithyanathan et al. ...... | 707/2 |
| 5,963,965 A | * | 10/1999 | Vogel ...................... | 715/501.1 |
| 6,070,158 A | * | 5/2000 | Kirsch et al. ............... | 707/3 |
| 6,137,911 A | * | 10/2000 | Zhilyaev .................. | 382/225 |
| 6,470,307 B1 | * | 10/2002 | Turney .................... | 704/9 |
| 6,493,713 B1 | * | 12/2002 | Kanno .................... | 707/6 |
| 6,842,876 B2 | * | 1/2005 | Schilit et al. .............. | 715/530 |

\* cited by examiner

*Primary Examiner*—Doug Hutton
*Assistant Examiner*—Quoc A Tran
(74) *Attorney, Agent, or Firm*—Gibb I.P. Law Firm, LLC

(57) ABSTRACT

A structure and method for automatically creating a dictionary for clustering text documents performs a first pass for each of the documents to determine a frequency of each word in each of the documents, creates a Hashtable of most frequently occurring words in the documents, performs a second pass for each of the documents to determine a frequency of phrases in each of the documents that contain only words in the Hashtable, adds the most frequently occurring phrases to the Hashtable, and outputting outputs the most frequently occurring words and the most frequently occurring phrases as the dictionary.

17 Claims, 2 Drawing Sheets

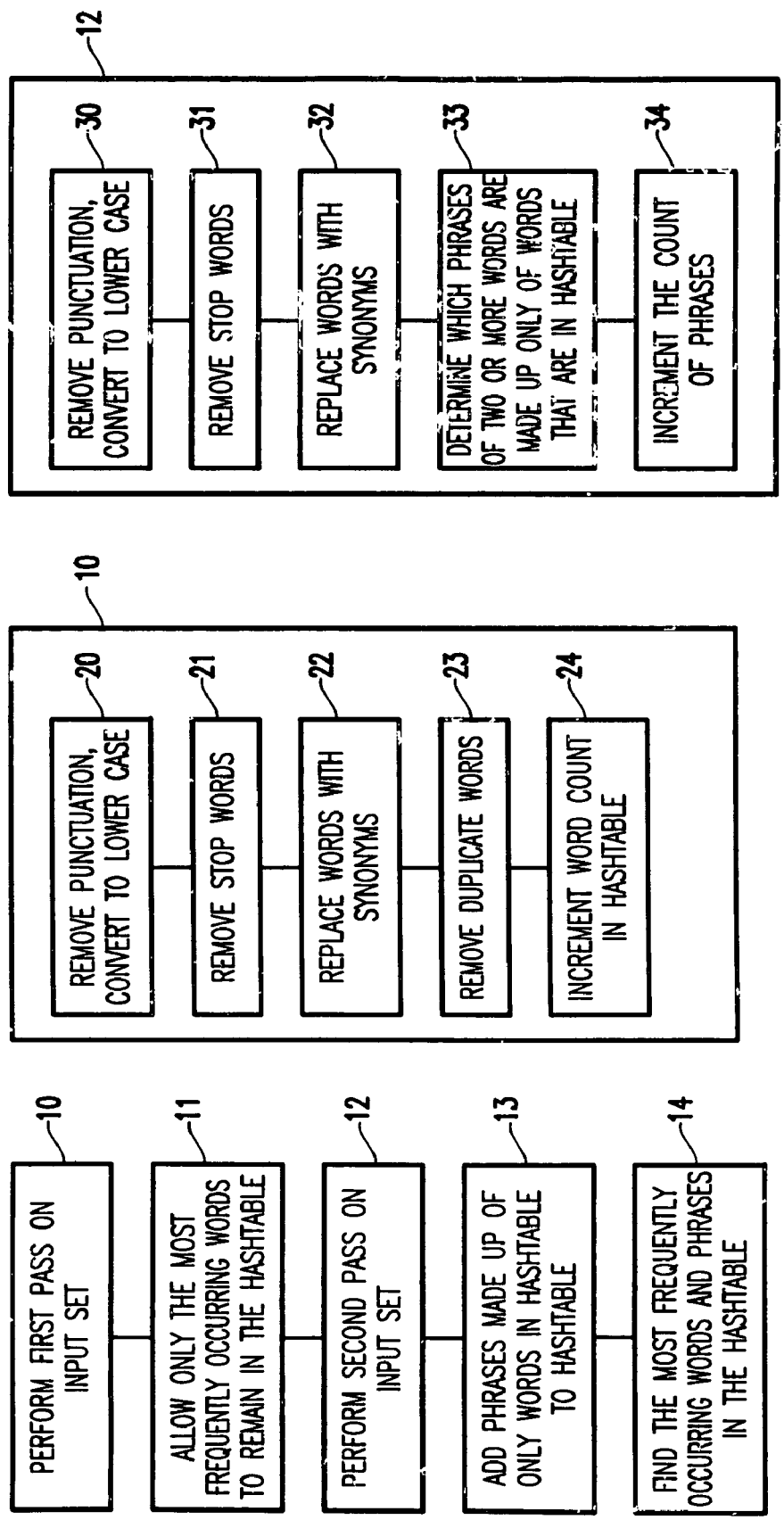

METHOD FOR GENERATION OF AN N-WORD PHRASE DICTIONARY FROM A TEXT CORPUS

BACKGROUND OF THE INVENTION

1. Field of the Invention

The present invention generally relates to automated document clustering, and more particularly to a system and method for creating word and phrase dictionaries that are based upon the word frequency of text documents.

2. Description of the Related Art

Automated document clustering is a key technology for grouping on-line text documents, such as those found on the Internet. Document clustering algorithms typically represent each document as an attribute vector, where each position of the vector represents the word frequency of a dictionary term.

Conventional systems for generating a dictionary from a text corpus have focused on individual words or have generated phrases based on a linguistic analysis. This conventional process is substantially more complex than the invention, as discussed below. Conventional methodologies do not describe a space and time efficient implementation for discovering phrases. As discussed in greater detail below, the invention is designed to quickly create a dictionary of maximal frequency terms (and/or phrases) using the smallest possible amount of memory.

SUMMARY OF THE INVENTION

It is, therefore, an object of the present invention to provide a structure and method for automatically creating a dictionary for clustering text documents, including performing a first pass for each of the documents to determine a frequency of each word in each of the documents, creating a Hashtable of most frequently occurring words in the documents, performing a second pass for each of the documents to determine a frequency of phrases in each of the documents that contain only words in the Hashtable and adding the most frequently occurring phrases to the Hashtable, and outputting the most frequently occurring words and the most frequently occurring phrases as the dictionary. The determination of the frequency of each word can include removing punctuation and case from the documents, removing stop words from the document, replacing words in the documents with synonyms, removing duplicate words from the documents, adding remaining words to the Hashtable, determining the frequency of each word remaining in the Hashtable, and removing words below a frequency level from the Hashtable.

Determining a frequency of phrases can also include removing punctuation and case from the documents, removing stop words from the documents, replacing words in the documents with synonyms, adding the phrases in each of the documents that contain only words in the Hashtable to the Hashtable, determining the frequency of the phrases remaining in the Hashtable, and removing phrases below a frequency level from the Hashtable.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a flow diagram illustrating a first embodiment of the invention;

FIG. 2 is a flow diagram illustrating, in greater detail, an item shown in FIG. 1;

FIG. 3 is a flow diagram illustrating, in greater detail, an item shown in FIG. 1.

DETAILED DESCRIPTION OF PREFERRED EMBODIMENTS OF THE INVENTION

Figure 4:
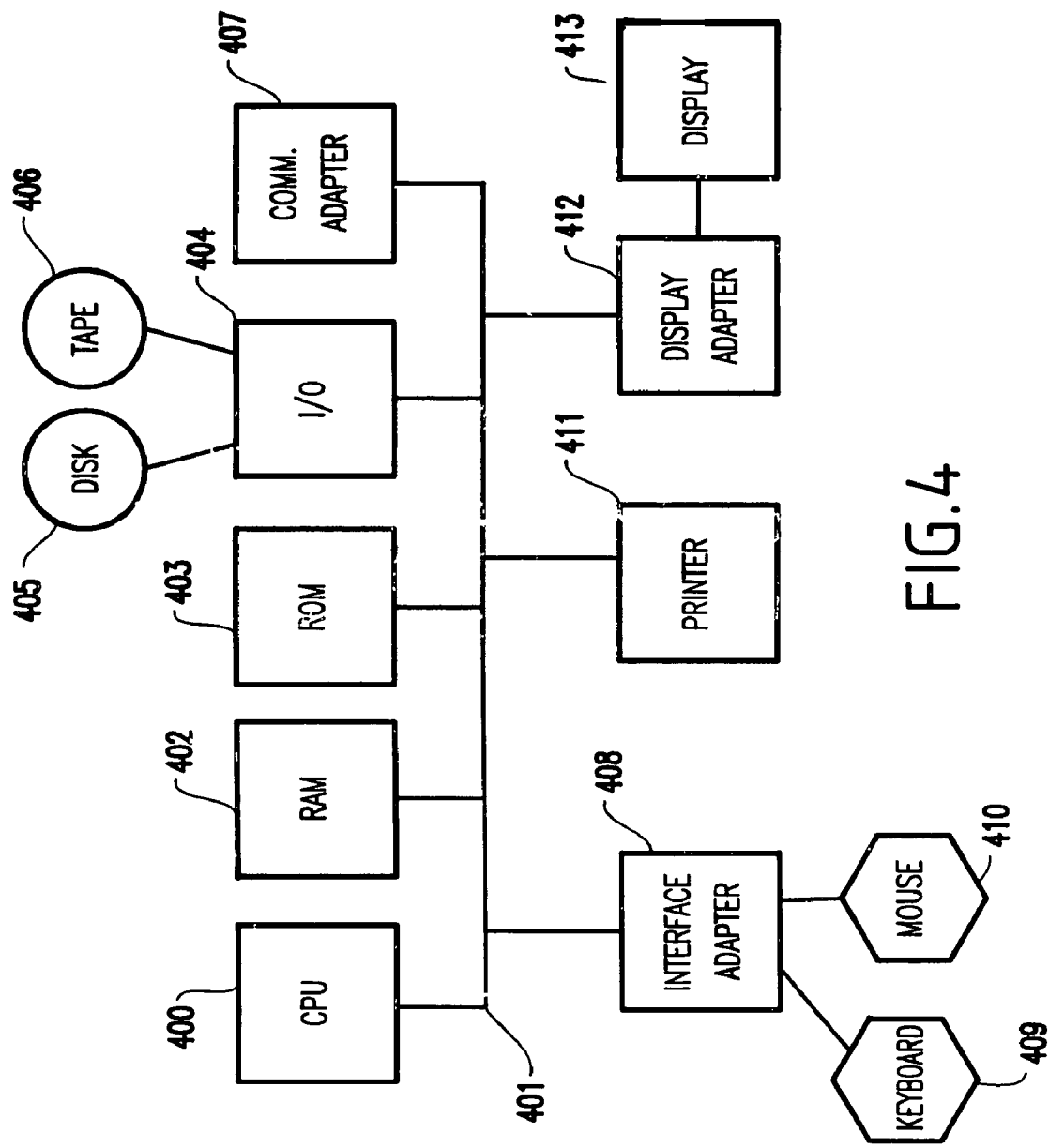
FIG. 4 it is a schematic diagram of a hardware embodiment of the invention.

The invention comprises a process for creating a dictionary for use in a vector representation of a document corpus. In particular, the invention uses a two pass approach to discover not only single words, but also N-word phrases, where N is an integer greater than one. The implementation of this invention can discover all of the most commonly occurring phrases in a text corpus in a time and memory efficient manner.

The invention allows the user to specify the size of the vector space model to be used in text clustering of a document corpus, as well as the maximum number of words that can occur in a phrase. The invention will find all of the phrases, up to the user specified length, that occur with the greatest frequency. The total number of phrases returned will depend upon the user specified maximum dictionary size.

The user inputs, for a given set of text documents, a value for phrase length (N), a vector space size (V), an optional set of stop words, and a table of synonyms, the invention finds those phrases that occur most frequently in the set of text documents.

More specifically, referring to FIG. 1, the invention performs a first pass on the set of text documents, as shown in the item 10. The detailed operations occurring in item 10 are explained below with respect to FIG. 2. Next, in item 11, the invention creates a Hashtable and keeps only the most frequently occurring words in the Hashtable. More specifically, the invention finds the V most frequently occurring words in the word-count Hashtable and conserves memory by removing from the Hashtable all words that occur with less frequency than the V most frequently occurring words. Then, as shown in item 12, the invention performs a second pass on the input set of text documents. The detailed operation of item 12 is shown in FIG. 3 and is discussed in greater detail below. In item 13, the invention adds phrases that are made up only of words in the word-count Hashtable to a phrase-count Hashtable. Finally, in item 14, the invention finds the most frequently occurring V words and phrases in the Hashtables and creates a dictionary of words and phrases from the Hashtables. While two separate Hashtables are discussed above, as would be known by one ordinarily skilled in the art given this disclosure, a single combined Hashtable could be utilized by the invention.

As shown in FIG. 2, for all documents in the input set (pass 1, item 10), punctuation is removed and all letters are converted to lower case (item 20). Next, as shown in item 21, stop words are removed and any words occurring in the synonym table are replaced with the designated synonym (item 22). Also, duplicated words are removed in item 23. The count of each of the remaining words are incremented in the word-count Hashtable (item 24).

Referring now to FIG. 3, for all documents in the input set (pass 2, item 12), the invention again removes punctuation and converts all characters to lower case (item 30). In item 31, stop words are removed and in item 32, words occurring in the synonym table are replaced with the designated synonym.

As shown in item 33, the invention determines which phrases (of two or more consecutive words) are made up only of words that are in the word-count Hashtable. More specifically, for x words (x=2; x<=N; x++), the invention adds phrases to the phrase-count Hashtable and increments the count (in the phrase-count Hashtable) of each unique phrase of x words occurring in sequences in the word list, if and only if all x words are contained in the word-count Hashtable. In order to conserve memory, the objects contained in the phrase-count Hashtable are preferrably pointers to existing objects in the word-count Hashtable. Duplications of the same phrase are not counted.

The inventive process for finding phrases in a text document can be illustrated with the following example. Assume the text corpus consists of only two documents: 1. "The quick, brown fox jumped over the lazy dog."2. "There is nothing worse than a lazy dog, except a speedy, brown fox." Further, in this example, N=3 (max number of words per phrase) and that V=5, (desired dictionary size). Further assume that the stop word list contains the words (the, and, a, there, is, than), while the synonym table contains the entries (quick & speedy=fast, and jumped & jumping=jump).

The invention performs the first pass on the first document, as shown in item 10 in FIG. 1 and shown in items 20-24 of FIG. 2. The punctuation is removed (item 20 FIG. 2) and the first document produces the list (the quick brown fox jumped over the lazy dog). Stop words are removed (item 21) to produce the list (quick brown fox jumped over lazy dog). Next, synonyms are replaced (item 22) to produces the list (fast brown fox jump over lazy dog). Duplicate words are removed (item 23) to produce the list (fast brown fox jump over lazy dog). The word-count Hashtable is incremented (item 24) to produce the word-count Hashtable (fast 1), (brown 1), (fox 1), dump 1), (over 1), (lazy 1), (dog 1).

The same process is repeated on the second document "There is nothing worse than a lazy dog, except a speedy, brown fox." As discussed above, items 20-23 are applied to the second document such that the punctuation is removed, stop words are removed, synonyms are replaced, and duplicate words are removed to produce the list (nothing worse lazy dog except fast brown fox). The word-count Hashtable is then modified (item 24) to produce the following word counts (fast 2), (brown 2), (fox 2), (jump 1), (over 1), (lazy 2), (dog 2), (nothing 1), (worse 1), (except 1). The processing of the first and second documents can be done sequentially or in parallel.

As shown in item 11 in FIG. 1, only the five most frequent words are allowed to remain in the Hashtable (as limited by the desired dictionary size of 5 words). In this example, only the five most frequently occurring words are fast, brown, fox, lazy, and dog.

Then, the invention performs a second pass on the first document, as shown in item 12 in FIG. 1 and, as shown in greater detail in FIG. 3. Once again, the punctuation and stop words are removed (items 30, 31) and the synonyms are replaced (item 32) to produce the list (fast brown fox jump over lazy dog). Then, as shown in item 33, the invention determines which phrases are made up only of words that are in the word-count Hashtable, which produces the list (fast brown), (brown fox), (lazy dog) for x=2 and (fast brown fox) for x=3. Phrases such as "fox jump" are not counted because jump is not contained in the word-count Hashtable.

The same process is repeated on the second document which produces the list (lazy dog), (fast brown), (brown fox) for x=2 and (fast brown fox) for x=3. After these additions, the phrase-count Hashtable stands as follows (fast-brown 2), (brown-fox 2), (lazy-dog 2), (fast-brown-fox 2). Then, in item 14, the invention produces the resulting list containing the most frequently occurring words and phrases: (fast, brown, fox, lazy, dog, fast-brown, brown-fox, lazy-dog, fast-brown-fox)

This invention can be implemented utilizing any conventional programming language and math. For example as a computer program, written in the Java programming language and executed with the Java virtual machine could be used, as shown below:

```
Hashtable allWords = new Hashtable( );
Hashtable allPhrases =new Hashtable( );
Hashtable stopWords =new Hashtable( );
Hashtable synonyms = new Hashtable( );
String words[ ] = null; // this is the resulting dictionary
Public PhraseDictionary(String textfile,
String stopWordsFile, String synonymsFile, nt N, int V) {
    // read in stop words and put them in a hashtable.
    try {
        if (stopWordsFile!=null) {
            BufferedReader br = Util.openReadFile(stopWordsFile);
            while (true) {
                String word = br.readLine( );
                if (word==null // word.equals("")) break;
                StopWords.put(word.notNull); }
            }
        }
    // read in synonyms and put them in a hashtable.
        if (synonymsFile!=null) {
            BufferedReader br = Util.openReadFile(synonymsFile);
            while (true) {
                String line = br.readLine( );
                    if (line==null // line.equals("")) break;
    // a StringVector is a Vector of Strings. This creation
            // method will tokenize the input String by the 'space'
            // character, creating a list of words.
            // Each line of the input file represents a list of
            // synonyms. The synonyms hashtable provides a means of
            // replacing each of these words with the first word of the //
            line.
                StringVector sv=new StringVector(line." ");
                for (int i:1: i<sv.size( ): i++)
                    Synonyms.put(sv.myElementAt(i).sv.
                    myElementAt(O));
            }
        }
    -// ndata represents the number of lines in the textfile. The
    // textfile represents all examples in the data set, one example
    // per line.
        int ndata = Util.getTextLength(texfile);
    BufferedReader br=Util.openReadFile(textfile);
    StringVector sv = null;
// This for loop represents the first pass of the algorithm.
        for (int i=0; i<ndata; i++) {
        // Create a Vector of words from a text example.
        sv=stringToStringVector(br.readLine( ));
        // Remove stop Words
        sv = removeStopWords(sv);
        // Replace synonyms
        sv = replaceSynonyms(sv);
        // Count all words.
        parseStringForWords(sv):
        };
        // calculate how frequently a word must occur to be
        // maintained
        int threshold = findThreshold(V);
        cleanUp(threshold);
        br = Util.openReadFile(textile);
    // Begin second pass through text data set.
        for (int i:0; i<ndata; i++) {
                sv = stringToStringVector(br.readLine( ));
                sv = replaceSynonyms(sv);
                sv = removeStopWords(sv);
                for (int x=2; x<=N; x++) {
                    // Create x-word phrases from the list of
                        words
                    // A Phrase object is simply an ordered list
                        of words.
                    Phrase p[ ] createPhrases(sv,x);
```

```
                    // Remember only phrases that use words in
                                the // allWords hashtable
                    ParseStringForPhrases(p);
            Threshold = findThreshold(V);
            StringVector saved Words = new StringVector( );
    // save terms in the allWords hashtable that are greater
    // than the threshold
            Enumeration e = allWords.keys( );
            while (e.hasMoreElements( )) {
                    String s = (String)e.nextElement( );
                    WordCounter val = (WordCounter)allWords.get(s);
                    if (val.wordcount>threshold) {
                            saved Words,addElement(s);
                    }
            }
    // save terms in the allPhrases hashtable that are greater
    // than the threshold
            E = allPhrases.keys( );
                    while (e.hasMoreElements( )) {
                            Phrase s = (Phrase)e.nextElement( );
                            WordCounter val =
                                    (WordCounter)allPhrases,get(s);
                            if (val.wordcount>threshold) {
                                    savedWords.addElement(""+s);
                            }
                    }
                    // convert the vector to an array
                    Words = savedWords.getStringArray( );
            } catch (Exception e) {e.printStackTrace( ); };
    }
    public static StringVector stringToStringVector(String s) {
            s = s.toLowerCase( );
            StringBuffer sb = new StringBuffer(2000);
            -int begin2 = (int)'a';
            int end2 = (int)'z';
            int begin3 = (int)'0';
            int end3 = (int)'9';
            for (int i:O; i<s.length( ); i++) {
                    int c = s.charAt(i);
                    if (c>=begin2 && c<=end2) {
                            sb.append((char)c);
                    }
                    else if (c>=begin3 && c<=end3)
                            sb.append((char)c);
                            else sb.append(' ');
            }
            String stuff = new String(sb);
            StringVector result = new StringVector(stuff," ");
            return(result);
    }
    Public StringVector replaceSynonyms(StringVector sv) {
            StringVector result = new StringVector( );
            for (int i=O; i<sv.size( ); i++) {
                    String s = sv.myElementAt(i);
                    String syn = (String)synonyms.qet(s);
                    if (syn==null) result.addElement(s);
                    else result.addElement(syn);
            }
            return(result);
    }
    public StringVector removeStopWords(StringVector sv) {
            StringVector result = new StringVector( );
            for (int i=O; i<sv.size( ); i++) {
                    String s = sv.myElementAt(i);
                    if (stop Words.get(s)==null) result.addElement(s);
            }
            return(result);
    }
    public void parseStringForWords(StringVector sv) {
            sv = removeDuplicates(sv);
            for (int i=O; i<sv.size( ); i++) {
                    String s: sv.myElementAt(i);
                    Object temp = stopWords.get(s);
                    if (temp!=null) continue;
                    WordCounter val = (WordCounter)allWords.get(s);
                    if (val==null) {
                            val = new WordCounter(s);
                            all Words.put(s,val);
                    }
                    else val.inc( );
            }
    }
    public int findThreshold(int numWords) {
            int n = allWords.size( );
            int m = allPhrases.size( );
            int wcounts[ ] = new int[n];
            Int pcounts[ ] = new int[m];
            Enumeration e = allWords.elements( );
            for (int i=O; i<n; i++) {
                    wordCounter wc = (WordCounter)e.nextElement( );
                    wcounts[i] = wc.wordcount;
            }
            e = allPhrases.elements( );
            for (int i=O; i<m; i++) {
                    wordCounter wc = (WordCounter)e.nextElement( );
                    pcounts[i] = wc.wordcount;
            }
            int worder[ ] = Index.run(wcounts);
            int porder[ ] = Index.run(pcounts);
            int wpos = wcounts.length-1;
            int ppos = pcounts.length-1;
            int total = O;
            while (total<numWords) {
                    if (wcounts[worder[wpos]]<pcounts[porder[ppos]])
                            Ppos--;
                    else wpos--;
                    Total++;
                    if (ppos== O // wpos == O) break;
            }
            return(wcounts[worder[wpos]]);
    }
    public void cleanUp(int i) {
            Enumeration e = allWords.keys( );
            while (e.hasMoreElements( )) {
                    String s = (String)e.nextElement( );
                    WordCounter val = (WordCounter)allWords.get(s);
                    if (val.wordcount<=i) {
                            allWords.remove(s);
                    }
            }
            e = allPhrases.keys( );
            while (e.hasMoreElements( )) {
                    Phrase s = (Phrase)e.nextElement( );
                    WordCounter val = (WordCounter)allPhrases.get(s);
                    if (val.wordcount<=i) {
                            allPhrases.remove(s);
                    }
            }
    }
    public Phrase[ ] createPhrases(StringVector sv. int size) {
            if (sv.size( )<size) return(new Phrase[O]);
            Phrase[ ] result = new Phrase[sv.size( )-(size-1)];
            for (int i=O; i<result.length: i++) {
                    String s[ ] new String[size];
                    for (int j=O: j<s.length: j++) {
                            s[j] = sv.myElementAt(i+j);
                    }
                    result[i] = new Phrase(s);
            }
            Return(result);
    }
    public void parseStringForPhrases(Phrase p[ ]) {
            MyIntVector duplicates = new MyIntVector( );
            for (int i=1: i<p.length: i++) {
                    for (int j=O: j<i; j++) {
                            if (p[j].equals(p[i])) duplicates.addElement(i);
                    }
            }
            for (int i=O; i<p.length; i++) {
                    // ignore duplicate phrases
                    if (duplicates.myContains(i)) continue
                    // ignore phrases having duplicate words
                    if (p[i].containsDuplicates( )) continue;
                    // ignore phrases which have a word not in dictionary
                    for (int j=O; j<p[i].length; j++) {
                            if (allWords.get(p[i].nth(j))==null) continue;
                    }
                    WordCounter val = (WordCounter)allPhrases.get(p[i]);
```

```
        if (val==null) {
            val = new WordCounter( );
            allPhrases.put(p[i],val);
        }
        else val.inc( );
    }
  }
}
```

Many existing methods for generating a dictionary from a text corpus have focused on individual words only or have generated phrases based on a linguistic analysis. The invention's methodology is purely lexical in nature and thus generalizes to multiple languages and to ungrammatical text. Previous methodologies that have suggested a lexical phrase generation technique have not described the space and time efficient implementation for discovering such phrases that the invention utilizes. The invention's implementation is designed to quickly find a maximal frequency term dictionary of a given size using the smallest possible amount of memory.

While the overall methodology of the invention is described above, the invention can be embodied in any number of different types of systems and executed in any number of different ways, as would be known by one ordinarily skilled in the art. For example, as illustrated in FIG. 4, a typical hardware configuration of an information handling/computer system in accordance with the invention preferably has at least one processor or central processing unit (CPU) 400. For example, the central processing unit 400 could include various image/texture processing units, mapping units, weighting units, classification units, clustering units, filters, adders, subtractors, comparators, etc. Alternatively, as would be known by one ordinarily skilled in the art given this disclosure, multiple specialized CPU's (or other similar individual functional units) could perform the same processing, mapping, weighting, classifying, clustering, filtering, adding, subtracting, comparing, etc.

The CPU 400 is interconnected via a system bus 401 to a random access memory (RAM) 402, read-only memory (ROM) 403, input/output (I/O) adapter 404 (for connecting peripheral devices such as disk units 405 and tape drives 406 to the bus 401), communication adapter 407 (for connecting an information handling system to a data processing network) user interface adapter 408 (for connecting peripherals 409-410 such as a keyboard, mouse, imager, microphone, speaker and/or other interface device to the bus 401), a printer 411, and display adapter 412 (for connecting the bus 401 to a display device 413). The invention could be implemented using the structure shown in FIG. 4 by including the inventive method, described above, within a computer program stored on the storage device 405. Such a computer program would act on an image supplied through the interface units 409-410 or through the network connection 407. The system would then automatically segment the textures and output the same on the display 413, through the printer 411 or back to the network 407.

The benefits which flow from this invention are derived from the ability to readily adapt the creation of text dictionaries containing both words and phrases to the capabilities of the computer hardware available. The invention allows the user to specify the dictionary size up front, without reference to the size or complexity of the data set to be analyzed, and the invention returns all of the most frequent terms which can fit within this memory constraint. This allows the user to analyze text data sets of arbitrary size and complexity on computer hardware of fixed memory and computational speed. Creation of word/phrase dictionaries on text data sets further allows for the analysis of unstructured text information in a semi-structured manner. Data mining algorithms and statistical measure can now be applied to the data to discover interesting relationships and trends. Dictionary creation is thus the first critical step in data mining and analysis of text data sets. Being able to generate such dictionaries quickly and efficiently and with high quality is therefore of key importance to successful text mining.

While the invention has been described in terms of preferred embodiments, those skilled in the art will recognize that the invention can be practiced with modification within the spirit and scope of the appended claims.

What is claimed is:

1. A method of automatically creating a dictionary for clustering text documents comprising:
   inputting a maximum dictionary size;
   determining a frequency of each word in each of said documents;
   creating a dictionary of most frequently occurring words in said documents as limited by said maximum dictionary size, such that said dictionary contains less than all words in said documents;
   after creating said dictionary, determining a frequency of phrases in each of said documents that contain only words in said dictionary;
   adding most frequently occurring phrases to said dictionary; and
   outputting said most frequently occurring words and said most frequently occurring phrases as said dictionary, wherein said dictionary size limits the number of words and phrases maintained in said dictionary.

2. The method in claim 1, wherein said determining a frequency of each word comprises:
   removing punctuation and case from said documents;
   removing stop words from said document;
   replacing words in said documents with synonyms;
   removing duplicate words from said documents;
   adding remaining words to said dictionary as limited by said maximum dictionary size;
   determining said frequency of each word remaining in said dictionary; and
   removing words below a frequency level from said dictionary.

3. The method in claim 2, further comprising inputting one or more of said stop words, said synonyms, and said frequency level.

4. The method in claim 1, wherein said determining a frequency of phrases comprises:
   removing punctuation and case from said documents;
   removing stop words from said document;
   replacing words in said documents with synonyms;
   adding said phrases in each of said documents that contain only words in said dictionary to said dictionary;
   determining said frequency of said phrases remaining in said dictionary; and
   removing phrases below a frequency level from said dictionary.

5. The method in claim 4, further comprising inputting one or more of said stop words, said synonyms, and said frequency level.

6. A method of automatically creating a dictionary for clustering text documents comprising:
   inputting a maximum dictionary size;
   performing a first pass for each of said documents comprising:

determining a frequency of each word in each of said documents; and creating a dictionary of most frequently occurring words in said documents as limited by said maximum dictionary size, such that said dictionary contains less than all words in said documents;

after performing said first pass, performing a second pass for each of said documents comprising:

determining a frequency of phrases in each of said documents that contain only words in said dictionary; and adding most frequently occurring phrases to said dictionary; and outputting said most frequently occurring words and said most frequently occurring phrases as said dictionary, wherein said dictionary size limits the number of words and phrases maintained in said dictionary.

7. The method in claim 6, wherein said determining a frequency of each word comprises:

removing punctuation and case from said documents;
removing stop words from said document;
replacing words in said documents with synonyms;
removing duplicate words from said documents;
adding remaining words to said dictionary as limited by said maximum dictionary size;
determining said frequency of each word remaining in said dictionary; and
removing words below a frequency level from said dictionary.

8. The method in claim 7, further comprising inputting one or more of said stop words, said synonyms, and said frequency level.

9. The method in claim 6, wherein said determining a frequency of phrases comprises:

removing punctuation and case from said documents;
removing stop words from said document;
replacing words in said documents with synonyms;
adding said phrases in each of said documents that contain only words in said dictionary to said dictionary;
determining said frequency of said phrases remaining in said dictionary; and
removing phrases below a frequency level from said dictionary.

10. The method in claim 9, further comprising inputting one or more of said stop words, said synonyms, and said frequency level.

11. A program storage device readable by machine, tangibly embodying a program of instructions executable by the machine to perform a method of automatically creating a dictionary for clustering text documents, said method comprising:

inputting a maximum dictionary size;
determining a frequency of each word in each of said documents;
creating a dictionary of most frequently occurring words in said documents as limited by said maximum dictionary size, such that said dictionary contains less than all words in said documents;
after creating said dictionary, determining a frequency of phrases in each of said documents that contain only words in said dictionary;
adding most frequently occurring phrases to said dictionary; and
outputting said most frequently occurring words and said most frequently occurring phrases as said dictionary, wherein said dictionary size limits the number of words and phrases maintained in said dictionary.

12. A program storage device as in claim 11, wherein said determining a frequency of each word comprises:

removing punctuation and case from said documents;
removing stop words from said document;
replacing words in said documents with synonyms;
removing duplicate words from said documents;
adding remaining words to said dictionary;
determining said frequency of each word remaining in said dictionary; and
removing words below a frequency level from said dictionary.

13. A program storage device as in claim 12, further comprising inputting one or more of said stop words, said synonyms, and said frequency level.

14. A program storage device as in claim 11, wherein said determining a frequency of phrases comprises:

removing punctuation and case from said documents;
removing stop words from said document;
replacing words in said documents with synonyms;
adding said phrases in each of said documents that contain only words in said dictionary to said dictionary;
determining said frequency of said phrases remaining in said dictionary; and
removing phrases below a frequency level from said dictionary.

15. A program storage device as in claim 14, further comprising inputting said stop words.

16. A program storage device as in claim 14, further comprising inputting said synonyms.

17. A program storage device as in claim 14, further comprising inputting said frequency level.

* * * * *